United States Patent
Greene et al.

(10) Patent No.: US 8,333,892 B2
(45) Date of Patent: Dec. 18, 2012

(54) QUICK CONNECT MODULAR WATER PURIFICATION SYSTEM

(75) Inventors: William A. Greene, Long Beach, CA (US); Jason D. Gilmour, Huntington Beach, CA (US)

(73) Assignee: Spintek Filtration, Inc., Los Alamitos, CA (US)

( * ) Notice: Subject to any disclaimer, the term of this patent is extended or adjusted under 35 U.S.C. 154(b) by 411 days.

(21) Appl. No.: 12/753,485

(22) Filed: Apr. 2, 2010

(65) Prior Publication Data
US 2010/0252501 A1 Oct. 7, 2010

Related U.S. Application Data

(60) Provisional application No. 61/211,868, filed on Apr. 2, 2009.

(51) Int. Cl.
*B01D 63/02* (2006.01)
*B01D 61/14* (2006.01)
*B01D 61/16* (2006.01)

(52) U.S. Cl. .............. 210/650; 210/321.88; 210/321.89; 210/232; 210/456; 210/458

(58) Field of Classification Search .................. None
See application file for complete search history.

(56) References Cited

U.S. PATENT DOCUMENTS

| | | | | |
|---|---|---|---|---|
| 3,422,008 A | * | 1/1969 | McLain | 210/646 |
| 4,220,535 A | * | 9/1980 | Leonard | 210/321.89 |
| 4,670,145 A | * | 6/1987 | Edwards | 210/321.87 |
| 4,784,768 A | * | 11/1988 | Mathieu | 210/321.8 |
| 4,876,006 A | * | 10/1989 | Ohkubo et al. | 210/321.69 |
| 5,071,552 A | * | 12/1991 | Bikson et al. | 210/321.8 |
| 6,616,841 B2 | * | 9/2003 | Cho et al. | 210/321.83 |
| 2001/0003949 A1 | * | 6/2001 | Monereau et al. | 95/55 |
| 2005/0194305 A1 | * | 9/2005 | Vido et al. | 210/321.88 |
| 2007/0125697 A1 | * | 6/2007 | Lee et al. | 210/321.69 |

* cited by examiner

*Primary Examiner* — Krishnan S Menon
(74) *Attorney, Agent, or Firm* — Leon D. Rosen

(57) ABSTRACT

Multiple water purifier modules are stacked in a rack having manifolds for each of the various water filtration functions: feed, concentrate, and filtrate. Each module connects to the rack by a quick connect for each of the filtration tubes. The quick connects are of the self-sealing type. A handle on the end of the module away from the rack has a lever for causing the quick connects to release the module from the rack while the system remains in operation. The, module can then be totally removed from the rack for testing, service, or replacement while the overall system remains in operation. Each module contains complete filtration media. The water is passed into the feed tubes under pressure where it passes into an elongated cavity filled with elongated hollow fibers. Filtrate, such as purer water, passes through the walls of the hollow fibers to an outlet, while concentrate, which is fluid with a high percent of impurities, flows from the cavity into concentrate tubes to another outlet for disposal. The tubes and concentrate tubes are small diameter tubes with small holes spaced along their lengths. The tubes lie at opposite sides of the cavity, rather than at opposite ends, and the tubes are surrounded by the fibers that are tightly packed together and that are tightly packed around the tubes, to control the flow rate of feed fluid between them.

5 Claims, 6 Drawing Sheets

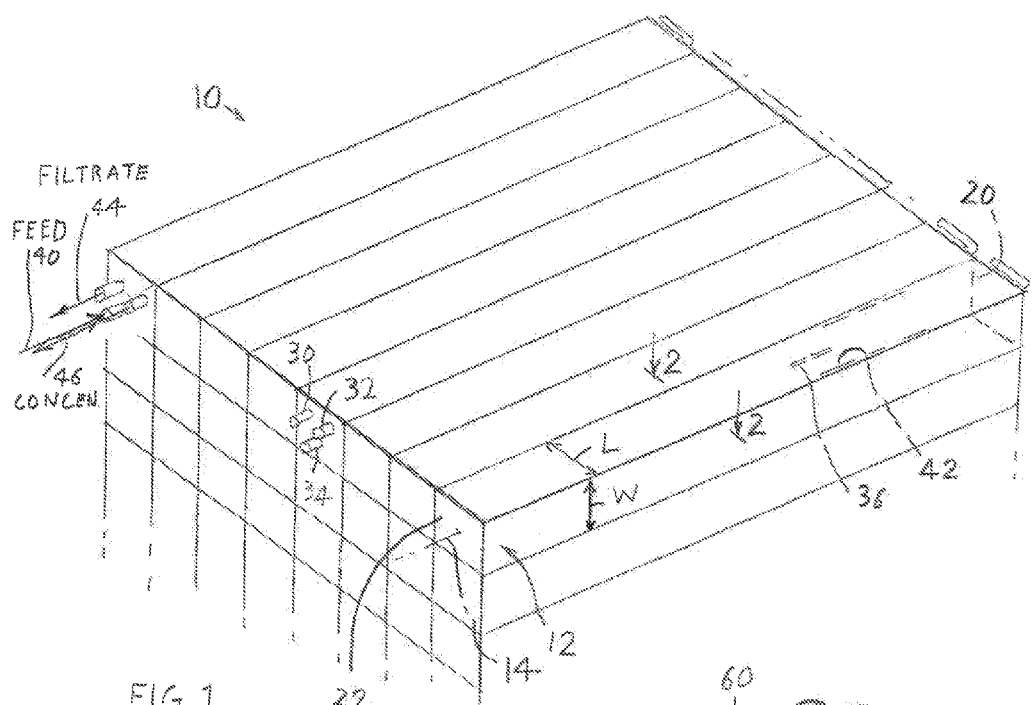

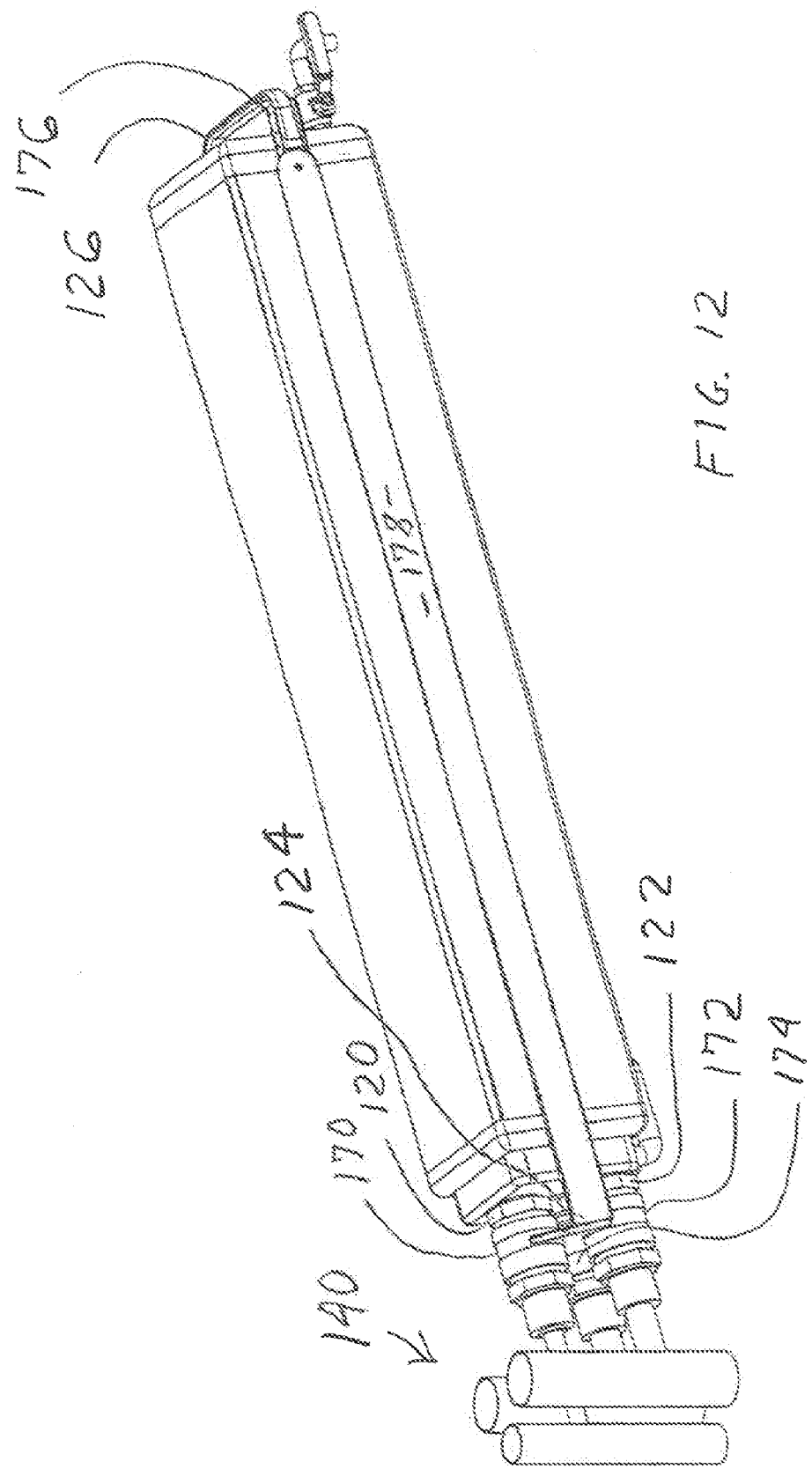

QUICK CONNECT MODULAR WATER PURIFICATION SYSTEM

CROSS-REFERENCE

Applicant claims priority from U.S. Provisional Patent Application Ser. No. 61/211,868 filed Apr. 2, 2009, which is incorporated herein by reference.

BACKGROUND OF THE INVENTION

Salt water and other feed fluids can be purified by applying the feed fluid under pressure to the outside of a bundle of hollow filter fibers that are packed into a cavity. The pure water, commonly referred to as filtrate, passes through the fiber walls and along the fiber passages, to a filtrate outlet for use as drinking water. The fibers typically lie in an elongated cavity, such as a cylindrical cavity that is seven inches in diameter and 80 inches long with the feed water pumped into one end of the cavity and concentrate removed at the opposite end. The walls of the cavity constitute one of many modules that are used in a system to supply the required flow capacity of filtrate, such as drinking water for a ship.

The pressure of the feed fluid drops along the length of the fiber bundle. As a result, a high pressure of water may have to be applied to the inlet end, or upstream end, of the cavity to assure there is sufficient pressure at the downstream end. A system that required water at lower pressure would be advantageous in many situations.

In some cases, a purifying system of given capacity must be as compact as possible, as in the case of many ships. This requires modules that can be closely stacked.

SUMMARY OF THE INVENTION

In accordance with one embodiment of the invention, multiple water purifier modules are stacked in a rack having manifolds for each of the various functions: feed, concentrate, and filtrate. Each module connects to the rack by a quick connect for each of the filtration tubes. The quick connects are of the self-sealing type. A handle on the end of the module away from the rack has a lever for causing the quick connects to release the module from the rack while the system remains in operation. The module can then be totally removed from the rack for testing, service, or replacement while the overall system remains in operation.

Each module of the system includes walls forming a cavity, and a bundle of hollow filter fibers that are closely packed in the cavity. Feed fluid, such as brackish or salty water, is fed under pressure to the cavity through one or more feed tubes. The feed tubes are of small diameter and extend primarily parallel to the length of the fibers, which extend along the length and axis of the cavity. Each feed tube has multiple small holes spaced along its length to distribute feed fluid more evenly along the length of the elongated cavity. Concentrate, which is fluid left after some filtrate has been removed from the feed fluid (by flowing filtrate into the hollow fibers), is received by one or more concentrate tubes.

The concentrate tubes each extends primarily along the length of the fibers, as do the feed tubes, and the concentrate tubes also have small holes spaced along their lengths. The feed tubes and concentrate tubes lie at opposite sides of the elongated cavity, to assure that feed fluid passes across multiple fibers in its passage between holes in the feed tubes and holes in the concentrate tubes.

The feed tubes and the concentrate tubes are each surrounded by fibers that are tightly packed together. This requires the feed fluid to pass closely across the outside surfaces of the fibers as the feed fluid flows towards the concentrate tube holes.

Each module has walls of primarily rectangular outside shape, and the cavity within the walls is of primarily rectangular shape. The rectangular shape allows multiple modules to be stacked closely together, so a system of given capacity occupies a minimum amount of floor space. This is important in many applications, as in vessels used by the military.

The novel features of the invention are set forth with particularity in the appended claims. The invention will be best understood from the following description when read in conjunction with the accompanying drawings.

DESCRIPTION OF THE DRAWINGS

FIG. 1 is a partial isometric view of a filtration system of the present invention.

FIG. 2 is a sectional view of one module of the system of FIG. 1, taken on line 2-2 of FIG. 1.

FIG. 3 is an enlarged sectional view of a feed tube and of multiple fibers that surround it, of the area 3-3 of FIG. 2.

FIG. 12 is a perspective view of a module with a release mechanism.

DESCRIPTION OF THE PREFERRED EMBODIMENTS

Figure 4:
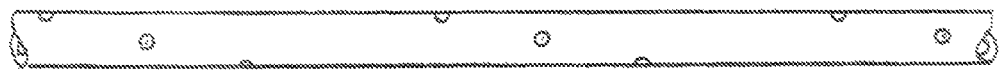
FIG. 4 is a side view of a portion of the feed tube of FIG. 3.

FIG. 1 shows a filtration system 10 of the invention, which includes many stacked modules 12. Each module is elongated along an axis 14, and is a plurality of times longer along its axis than along its width W or lateral length L. Each module has front and rear ends 20, 22. The rear end of each module has three ports including a feed port 30, a filtrate port 32 and a concentrate port 34. The module has additional ports that are not shown in the figure. As shown in FIG. 2, the module has a cavity 42 that is completely filled with hollow filter fibers 36 that extend along the axis 14. Feed fluid 40 (FIG. 1), such as brackish or salty water, is pumped through the feed port into the cavity 42 formed by the module, for purification. Filtrate 44, such as pure water (water with reduced solutes) exits the module through the filtrate port 32. Concentrate 46, which may include water that contains a higher concentration of solute such as salt than the original salt water, exits through the concentrate port. In the following description, applicant often uses the term "feed water" to mean "feed fluid" of any type that is to be purified, since the most common application of the invention is in purifying brackish or salty water.

Figure 5:
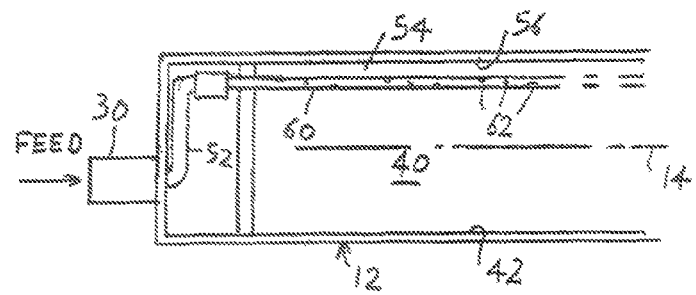
FIG. 5 is a partial sectional view of an end portion of the module of FIG. 2, showing only a feed tube thereof.

FIG. 5 shows that feed fluid 36 is pumped under a pressure on the order of magnitude of 100 psi (7 bar) through the feed port 30 into the module. A conduit 52 carries the feed fluid to an upper side portion 54 (FIG. 2) of the cavity, which is closer to the top 56 of the cavity 42 than to the axis 14. The feed fluid passes along a small diameter feed tube 60 that extends along the upper side portion of the cavity, along the considerable length of the cavity. The feed tube has multiple small holes 62, and the feed fluid passes out of the holes 62 into the rest of the cavity. FIG. 2 shows that the particular system illustrated has two feed tubes 60 that each extends along the upper side portion 54 of the cavity. FIG. 2 also shows two concentrate tubes 64 that extend along the lower side portion 70 of the cavity.

Figure 6:
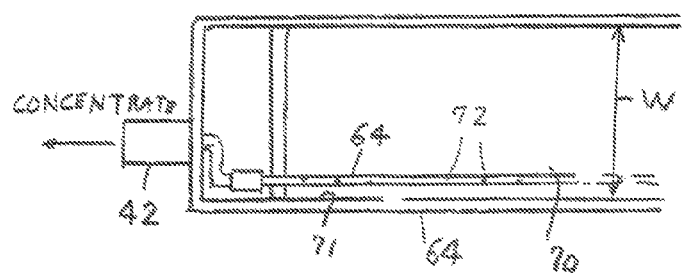
FIG. 6 is a view similar to that of FIG. 5, but showing only a concentrate tube thereof.

FIG. 6 shows that each concentrate tube 64 extends along the cavity lower side portion near the lower side 71, along the considerable length of the cavity. Each concentrate tube has multiple small holes 72 spaced along the concentrate tube length. Feed fluid that has entered the cavity through one of the feed tube holes 62 must pass along a majority of the width W of the cavity before it reaches one of the concentrate tube holes 72 and can exit the cavity. In its path between the feed and concentrate tubes, the feed fluid passes along the outside of many hollow fibers.

FIG. 2 shows that the feed fluid 40 and fibers 36 fill the cavity. As shown in FIG. 3, the fibers are tightly packed in the cavity to leave only thin spaces 74 between them through which the feed fluid can pass in its primarily downward D path towards the concentrate tube. The system must be designed with care to assure that most, or a high portion, of the pressure drop of the pressured feed fluid, occurs during the passage of fluid through the walls 80 of the fibers into the fiber passages 82. Also, the system must be designed so a considerable portion of the solvent (e.g. the fresh water of salt water feed fluid) has passed into the fibers before the feed fluid reaches the concentrate tube. A major portion of the energy used to operate the system is the energy required to pressurize the feed fluid to a high pressure (e.g. on the order of magnitude of 100 psi) before pumping it through the feed port into the cavity. If the feed fluid passes through the cavity and reaches the concentrate outlet before significant solvent (e.g. water of salt water) has passed into the fibers, then there will be little filtrate produced for a given amount of energy expended to pressurize the feed fluid.

Applicant helps assure that the feed fluid will pass slowly across the outer surfaces 84 of the fibers, by the fact that the fibers are tightly packed in the cavity and are tightly packed around the feed tube. Such tight packing results in only narrow spaces through which the feed fluid can flow so the fluid moves slowly and remains in contact with the fiber outside surfaces for a considerable amount of time. Such slow movement of the feed fluid is also assured by placing the feed and concentrate tubes at opposite sides of the cavity. Fibers 36 surround each feed tube 60 by more than 180° and preferably by more than 270°.

Applicant assures that feed fluid will not flow too fast between the feed and concentrate tubes, in the event that there is more than the expected amount of space between some fibers. This is done by making the feed tube holes 62 (FIG. 3) small and preferably by also making the concentrate tube holes 72 small. The small tube holes result in a pressure drop on the order of magnitude of 0.5 psi (0.03 bar) in the passage of feed fluid through a feed hole 62 into the cavity. If the rate of feed fluid flow into the cavity is considerably above the desired rate, then the higher pressure drop across the feed tube hole will lower the rate of flow into the cavity. A similar phenomenon occurs at the concentrate tube holes. Since feed fluid passes into the cavity at the numerous locations of the numerous feed tube holes, an increased flow between only one feed hole and a closest concentrate hole will result in only a moderate increase in feed fluid flow rate.

Figure 7:
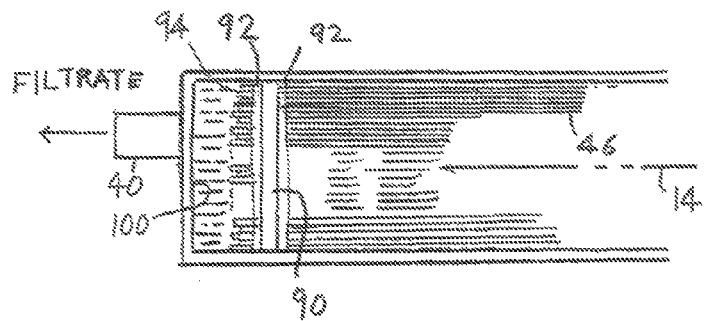
FIG. 7 is, a view similar to that of FIG. 5, but showing only a filtrate outlet and a bundle of filter fibers.

FIG. 6 shows that the concentrate tube 64 is connected to the concentrate port 42 in a manner similar to that for the feed tube. FIG. 7 shows that the fibers 46 are packed into a tight pack prior to insertion into the cavity. The fibers also have been extended through a wall 90, and end portions of the fibers have been sealed to walls of the cavity as by adhesive 92, without sealing the fiber passages. The tips 94 of the fibers open to a chamber 100 that leads to the filtrate port 40.

In a system that applicant has constructed, the fibers 36 (FIG. 3) each have an outside diameter of 1.5 millimeters and have a passage 38 of a diameter of 0.75 mm. Each of the two feed tubes 60 have an outside diameter of 6 mm, and each feed tube hole 62 has a diameter of 0.4 mm. There are ten feed tube holes, which are spaced apart by 8 mm. The use of small diameter feed tube holes has the additional advantage that they require only a small feed tube wall thickness. If the feed tube wall thickness had to be much greater because of the high fluid pressure and large feed tube wall thickness, then the feed tube would occupy more of the cavity cross section and thereby leave less room for fibers.

The system that applicant designed had modules having a width and lateral length that were each 6 inches (152 mm), and had an axial length along its axis of 40 inches (1020 mm). Each cavity has a cross-section of about 5.5 inches by 5.5 inches, or about 30 inch$^2$ (19,000 mm$^2$). Each feed tube 60 had an outside diameter of 6 mm for a cross-section of 36 mm$^2$. Thus, the two feed tubes occupied only about 0.4% of the cross-section of the cavity. It is desirable that the feed tubes occupy no more than 2% of the cross-section, and preferably no more than 1% thereof.

Figure 8:
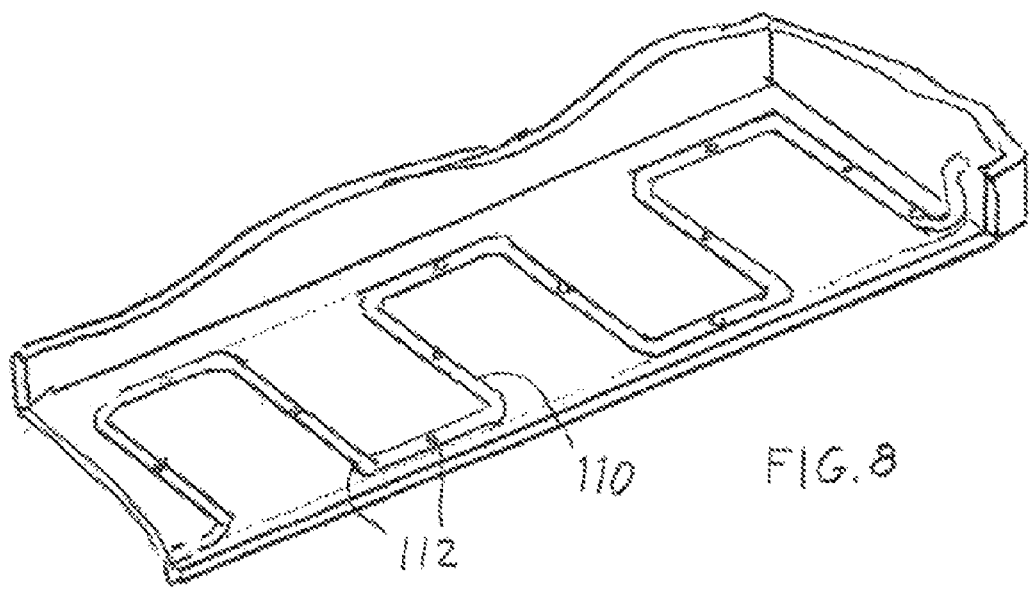
FIG. 8 is a partial isometric view of the module of FIG. 2, showing the air scrub tube.

At intervals of about 12 hours during heavy use of the system, it is desirable to apply an air scrub. During an air scrub, air is released into the cavity and is removed through the feed tube holes. The air scrub helps remove particles from the pores at the outside of the fibers, to allow more filtrate to penetrate the fibers. FIGS. 2 and 8 shows that applicant provides an air tube 110 with holes 112, that extends through the length of the cavity. The air tube lies below the fibers, and possibly in a chamber that is separated by a screen from the pack of fibers. The air tube extends in a serpentine path along the module length to apply air throughout the cavity.

Figure 9:
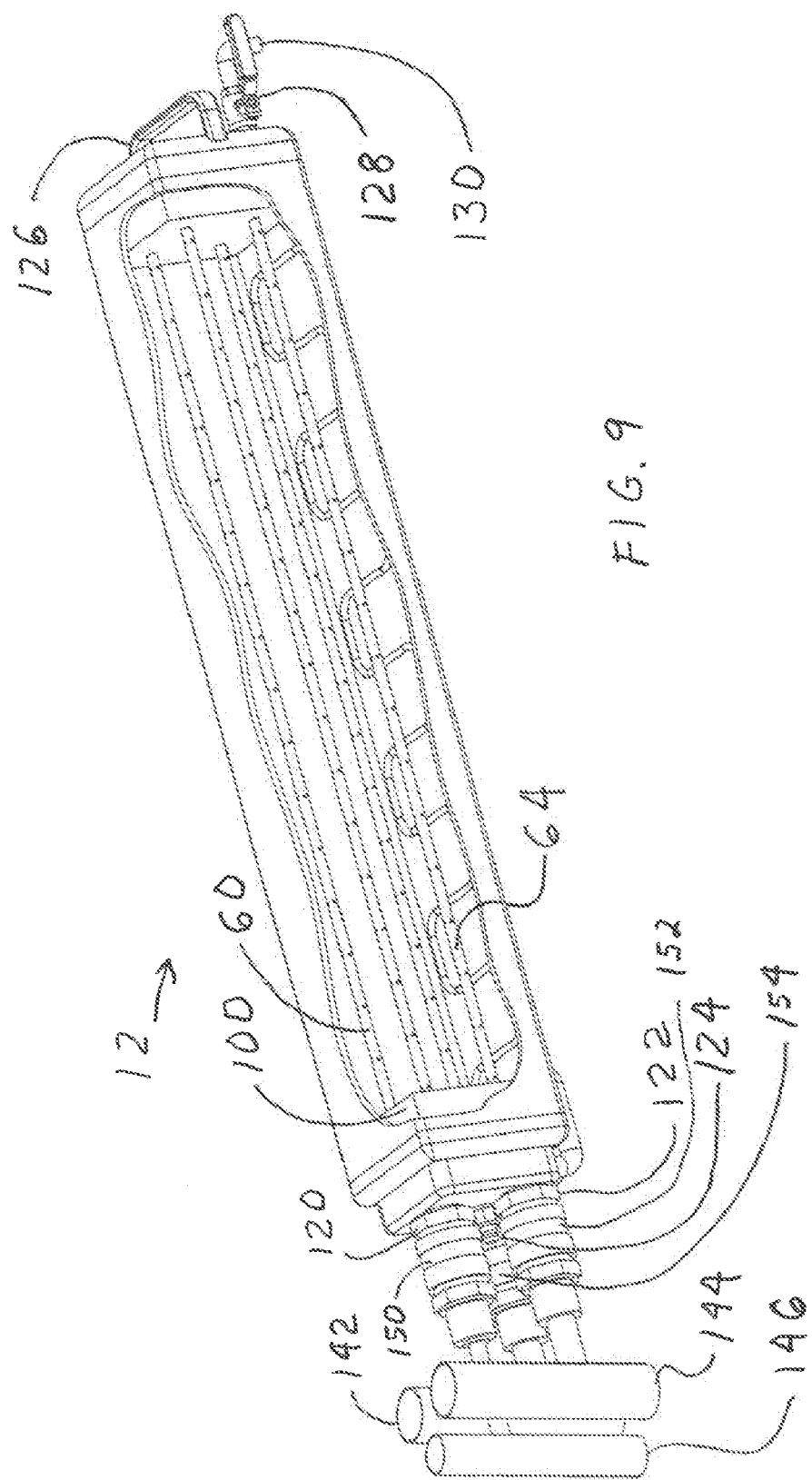
FIG. 9 is a perspective view of one module with the top and one side wall open to show the interior.

FIG. 9 is a perspective view of one module 12 with the top and one side wall open to show the interior. On the left end are male quick connect plugs 120, 122, and 124 that are connected to feed tube 60, concentrate tube 64, and filtrate in chamber 100, respectively. On the right end is a handle 126 for manipulating the module. A valve 128 and spigot 130 allow the condition of the module to be tested.

Figure 10:
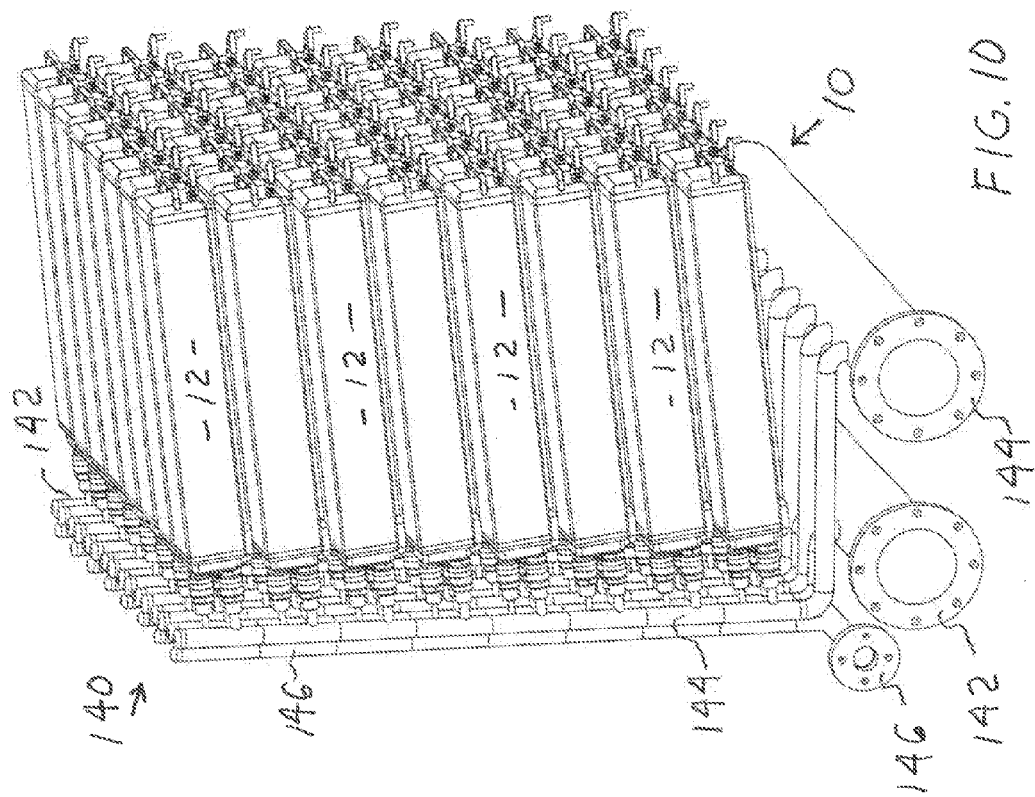
FIG. 10 is a perspective view of the module with the left end connected to rack manifolds by quick connects.

FIG. 10 is a perspective view of sixty-four of the modules 12 plugged into a rack 140 having manifolds for each function: feed manifold 142, concentrate manifold 144, and filtrate manifold 146. This created the overall filtration system 10 having eight rows and eight columns. In the system that applicant designed, fluid in the form of sea water (salt concentration of 3.5%) was designed to flow through the system of sixty-four modules at a rate of about 8 gallons per minute.

FIG. 9 shows how one module 12 connects to the rack manifolds 142, 144, and 146 by self sealing quick connects 150, 152, and 154. These are typical liquid quick connects with the female quick connect sockets on the rack 140 (FIG. 10) and the male quick connect plugs 120, 122, 124 on the module 12. The female portions are self-sealing. That is, they allow fluid to pass only when the male portion is inserted in the female portion. When the male plugs are removed as happens when a module 12 is removed from the rack 140, the female sockets immediately close preventing fluid in the manifolds from squirting out or air from being sucked in the system.

Figure 11:
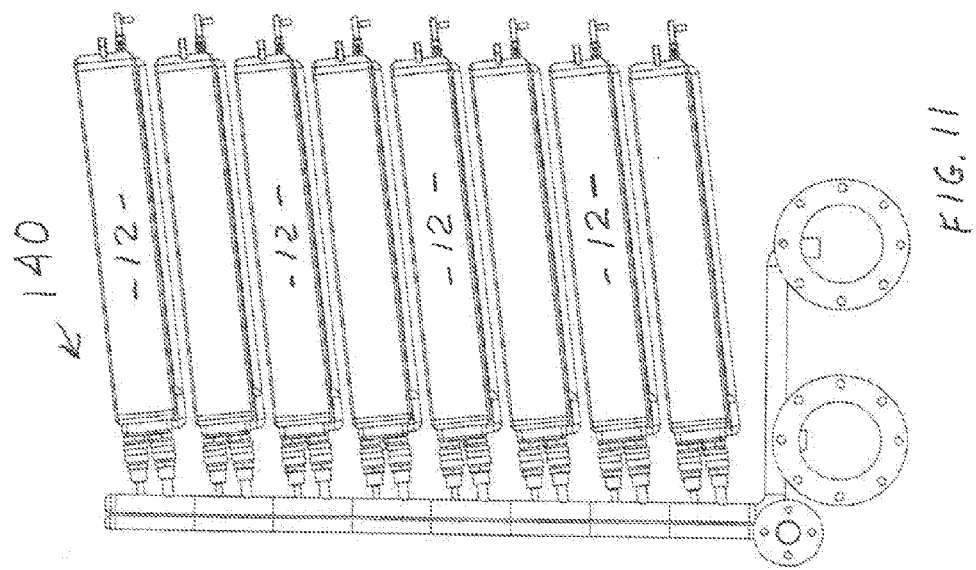
FIG. 11 is a side elevation view of the rack.

FIG. 11 is a side elevation view of the rack 140. Each module 12 is entirely supported on the rack by the quick connects.

FIG. 12 is a perspective view of a module 12 with a release mechanism. When a module is to be removed for servicing, the collars 170, 172, and 174 must be pushed back on the sockets to release the male plugs 120, 122, and 124 from the female sockets. This is done by gripping the handle 126 and squeezing a lever 176 underneath. This pushes a slide 178 along the side of the module which pushes on the quick connect collars 170, 172, 174 to release the male plugs 120, 122, and 124 from the sockets. This releases the module 12 from the rack 140.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A water treatment system that has a feed inlet for receiving feed fluid and flowing it into a feed cavity that contains multiple elongated hollow filter fibers that extend along a first direction, the system being constructed to flow filtrate through the fibers and out of the system through a filtrate outlet, and the system being constructed to flow concentrate that lies in the feed cavity around the fibers into a concentrate outlet, wherein:

said system includes a housing that forms said feed cavity, said feed cavity having opposite side portions spaced perpendicular to said first direction;

at least one elongated feed tube that connects to said feed inlet and that extends along said first direction and that has a plurality of holes spaced along its length;

at least one elongated concentrate tube that connects to said concentrate outlet and that extends along said first direction and that has a plurality of holes spaced along its length;

said feed water tube and said concentrate tube lies at said opposite side portions of said feed water cavity, and said fibers are packed against one another and lie around a majority of said feed and concentrate tubes.

2. The system described in claim 1 wherein:

said feed cavity has a width (W), a lateral distance (L) and an axial length, with said axial length extending along said first direction;

said feed tube has a cross section perpendicular to said axial length, that occupies no more than 1% of the cross-section of said cavity perpendicular to said length.

3. The system described in claim 1 wherein:

said housing and housing elements each has a housing outside with a width, a lateral length, and an axial length, with said axial length extending along said first direction, said housing having outside walls of rectangular cross-section;

a replaceable module that includes said housing that forms said feed cavity, said feed cavity being of rectangular cross-section and having a top, a bottom and opposite sides, and said module having a rear wall with said feed inlet, said filtrate outlet, and said concentrate outlet mounted on said rear wall;

said at least one feed water tube and at least one concentrate tube lying in said cavity with each surrounded by said fibers, whereby to provide a compact high capacity system in which the fibers in a cavity can be replaced by disconnecting the module and substituting another module.

4. The system described in claim 1 including an air scrubber that is capable of releasing air bubbles at a lower end of said feed cavity to clean said fibers during a scrub procedure, wherein:

said air scrubber includes an air pipe that has a length and that has multiple air pipe holes spaced along the pipe length, said air pipe extending along a bottom of said cavity, and said air pipe extending in a serpentine path along said bottom of said cavity with some of said air pipe holes lying at opposite side portions of said cavity bottom.

5. A method for treating feed water by applying the feed water under pressure to elongated fibers that lie in an elongated cavity that has widely spaced opposite side portions and a cavity length, said opposite side portions spaced perpendicular to said cavity length, and wherein the fibers have passages so filtrate moves through the walls of the fibers into their passages from which filtrate is gathered, while withdrawing concentrate from the cavity, comprising:

packing multiple ones of said fibers in said cavity to form a fiber pack wherein said fibers have sides that abut one another and all of said fibers extend along said cavity length;

placing at least one feed tube and one concentrate tube in said fiber pack with each tube having tube walls with a plurality of holes therein spaced along a length of the tube and with each tube being elongated and extending along said cavity length, said feed and concentrate tubes are surrounded by said fibers, with said feed and concentrate tubes lying on said opposite side portions of said cavity, whereby to flow feed fluid from said feed tube and past said fibers to said concentrate tube so some of the filtrate in the feed water passes through the fiber walls into the fiber passage.

* * * * *